United States Patent [19]

Daniel

[11] 4,071,121

[45] Jan. 31, 1978

[54] AUTOMATIC ADJUSTMENT APPARATUS FOR A FRICTION BRAKE

[75] Inventor: Peter Daniel, Pratteln, Switzerland

[73] Assignee: Inventio AG, Hergiswil, Switzerland

[21] Appl. No.: 750,253

[22] Filed: Dec. 13, 1976

[30] Foreign Application Priority Data

Dec. 22, 1975 Switzerland ............... 16577/75

[51] Int. Cl.² .................................. F16D 65/54
[52] U.S. Cl. .......................... 188/196 P; 188/171
[58] Field of Search .............. 188/171, 196 F, 196 P, 188/196 V; 192/111 A

[56] References Cited

U.S. PATENT DOCUMENTS 3,848,704   11/1974   Falk .................. 188/196 V

*Primary Examiner*—Duane A. Reger
*Attorney, Agent, or Firm*—Werner W. Kleeman

[57] ABSTRACT

An automatic adjustment apparatus for a friction brake containing at least two braking elements between which there is arranged a brake lining and which are pressed against one another in a braking position. At least one of the brake elements is adjustably arranged. There is provided a cylindrical portion having a shoulder, and disc-shaped adjustment elements are arranged upon the cylindrical portion to both sides of the shoulder. The disc-shaped adjustment elements are displaceable by means of the adjustable braking element which is movable relative to the shoulder upon wear of the brake lining. Upon such wear of the brake lining amounting to the thickness of an adjustment element or a predetermined fraction of such thickness, the adjustment element arranged directly at the shoulder upon the larger diameter part of the cylindrical portion is displaceable onto its smaller diameter part. Importantly, the disc-shaped adjustment elements comprise shaft securing rings which are under radial stress when seated upon the larger diameter part of the cylindrical portion and lose such radial stress when transferred to the smaller diameter part of the cylindrical portion.

5 Claims, 2 Drawing Figures

AUTOMATIC ADJUSTMENT APPARATUS FOR A FRICTION BRAKE

BACKGROUND OF THE INVENTION

The present invention relates to a new and improved construction of an automatic adjustment for a friction brake comprising at least two braking or brake elements between which there is arranged a brake lining, and which are pressed into contact with one another in a braking position.

Adjustment devices for friction brakes serve the purpose of compensating the increased size of the braking gap which is produced as a result of wear of the brake lining, so that such braking gap can be maintained approximately constant.

The heretofore known adjustment apparatuses, as a general rule possess adjustment elements which limit the air path or stroke either in a force-locking or form-locking manner.

The drawbacks of adjustment apparatuses working with a force-locking or frictional connection, generally reside in the fact that they are oftentimes much too complicated and expensive in construction. Also, for certain fields of application they fail to satisfactorily comply with the safety requirements imposed upon friction brakes, since due to wear or fabrication errors, unintentional displacements of the adjustment elements can arise.

These drawbacks are avoided with adjustment apparatuses of the second mentioned type. According to the construction of a self-adjusting jaw brake, as disclosed in U.S. Pat. No. 3,710,897, the connection rod of the brake levers carrying the brake jaws, is provided at one end with a conical portion or tapered socket of large diameter, upon which there are arranged to suspend in vertical direction, thin plate-shaped adjustment elements. The adjustment elements possess keyhole-shaped openings, and they are guided upon the conical portion by means of the circular-portion of the opening. Upon decrease of the spacing between both brake levers, due to wear of the brake lining on the order of magnitude amounting to the thickness of an adjustment element, the connection rod shifts by the same amount relative to the adjustment elements. The adjustment element suspended at the beginning of the conical portion therefore slides down and falls onto the connection rod, and is guided by means of the slot-portion of the keyhole thereon. Consequently, the decrease of the spacing between both brake levers, resulting from wear, cannot be eliminated since the connection rod is blocked in a form-locking manner by means of the adjustment element which has slid down.

The drawback of this adjustment apparatus particularly resides in the fact that the movement of the adjustment elements is accomplished by the force of gravity, so that it is dependent upon position and cannot be used for all applications. Since the positive functioning requires the use of sufficiently heavy adjustment elements, such must possess a minimum thickness, with the result that the adjustment, under some circumstances, becomes much too coarse.

SUMMARY OF THE INVENTION

It is therefore a general object of the present invention to provide a new and improved construction of an automatic adjustment apparatus for a friction brake which is not associated with the aforementioned drawbacks and limitations of the prior art proposals.

Another and more specific object of the present invention aims at the provision of an automatic adjustment apparatus for a friction brake which maintains the air stroke constant and limits such in a form-locking manner, yet does not exhibit the above-indicated drawbacks, rather can function completely independent of position and is adjustable in fine increments or stages.

Now in order to implement these and still further objects of the invention, which will become more readily apparent as the description proceeds, the automatic adjustment apparatus for a friction brake of the previously mentioned type, as contemplated by the invention, is manifested by the features that at least one of the brake elements is arranged to be adjustable and there is provided a cylindrical portion having a shoulder. Substantially disc-shaped adjustment elements are arranged on the cylindrical portion to both sides of the shoulder. These disc-shaped adjustment elements are movable by means of the adjustable braking element which is movable relative to the shoulder upon wear of the brake lining, so that upon wear of the brake lining amounting on the order of magnitude to, for instance, the thickness of an adjustment element, the adjustment element arranged directly at the shoulder upon the larger diameter part of the cylindrical portion is displaceable onto the smaller diameter part of the cylindrical portion. According to important aspects of the invention, the disc-shaped adjustment elements are shaft securing rings which, when seated upon the larger diameter part of the cylindrical portion, are under radial stress, but upon transfer to the smaller diameter part of the cylindrical portion are not under such radial stress.

In order to be able to realize, for a given minimum thickness of the shaft securing rings, smaller adjustment steps or increments than corresponding to such thickness, a further manifestation of the invention contemplates providing at the cylindrical portion at least two shoulders, the mutual spacing of which amounts to an integer multiple plus one-half of the thickness of a shaft securing ring. Further, between the shaft securing rings associated with the relevant shoulder, there is provided a spacer ring transmitting the adjustment movement, and wherein, whenever there occurs wear of the brake lining on the order of magnitude of one-half of the thickness of a shaft securing ring, the shaft securing rings seated directly at the shoulder at the larger diameter part alternately drops onto the smaller diameter part.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
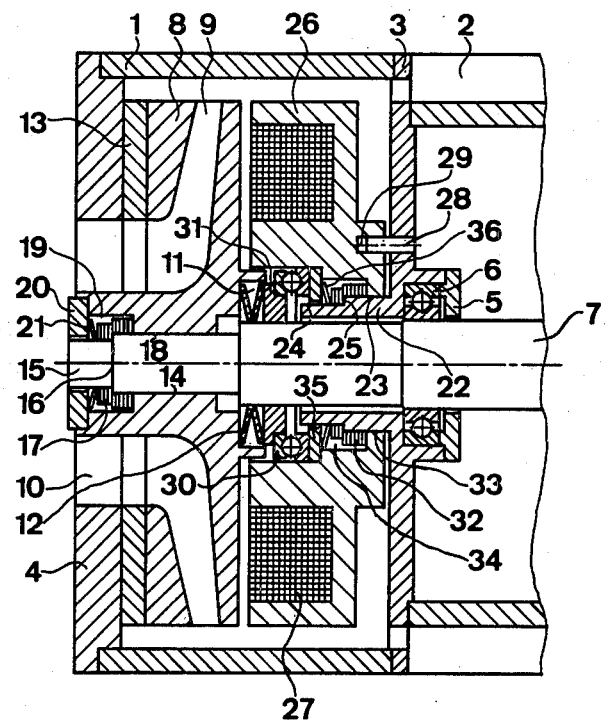
FIG. 1 is a longitudinal sectional view of an electromagnetically actuated disc brake possessing a respective automatic adjustment apparatus for the brake disc and for the electromagnetic.

Describing now the drawings, in FIG. 1 reference character 1 designates a brake housing which is threadably connected by means of an intermediate wall 3 with a motor housing 2. The brake housing 1 is closed towards the outside by means of a housing cover 4 forming a stationary braking element. At the intermediate wall 3 there is arranged a ball bearing 6 which is fixedly held in place by means of a ball bearing cover 5. This ball bearing 6 serves for mounting a drive shaft 7 at the side of the brake and which forms a cylindrical portion of a not particularly illustrated brake motor. At the end of the drive shaft 7 there is rigidly mounted for rotation therewith a brake disc 8 forming an adjustable braking element, this brake disc 8, however, being axially displaceable. The brake disc 8 possesses ventilation channels 9 which flow communicate with an air inlet opening 10 mounted at the housing cover 4. During the braking operation, the brake disc 8 is pressed against a brake lining 13, attached to the housing cover 4, by means of brake springs 12 guided in a recess 11 of the brake disc 8.

The end of the drive shaft 7 possesses two different diameters 14, 15, i.e. different diameter parts, wherein the transition from the layer diameter part 14 to the smaller diameter part 15 is formed by an upstanding or vertical shoulder 16. To both sides of the shoulder 16 there are arranged conventional shaft securing or retaining rings 17 which have been ground to a minimum thickness. The shaft securing rings 17 which are seated upon the larger diameter part 14 are under radial stress. The shaft securing rings 17 are limited in the axial direction by means of a ring-shaped or ring groove 19 provided in a bearing bore 18 of the brake disc 8, the ring groove 19 being formed by a bored or otherwise machined portion of the bearing bore 18 and which is closed by a disc or plate 20. Arranged upon the smaller diameter part 15 is a spring 21 which presses the shaft securing rings 17, located in a relaxed or non-stressed condition upon such smaller diameter part 15, against the shoulder 16.

Arranged at the intermediate wall 3 is a cylindrical portion 22 concentrically surrounding the drive shaft 7 and protruding into the brake housing 1. This cylindrical portion 22 has two different diameters 23, 24, i.e., two different diameter parts. The transition between the larger diameter part 23 situated closest to the intermediate wall 3 to the smaller diameter part 24 is formed by an upstanding or vertical shoulder 25. Arranged upon the larger diameter part 23 is an axially displaceable electromagnet 26 having a winding 27. A bolt 28 secured at the intermediate wall 3 engages into a bore 29 of the electromagnet 26, thereby preventing any rotation thereof. In the electromagnet 26 there is mounted a deep-groove ball bearing 30 which is centered by means of a pressure or compression ring 31 against which bears the brake springs 12.

Arranged upon the cylindrical portion 22 to both sides of the shoulder 25 are commercially available shaft securing or retaining rings 32 which have been ground to a minimum thickness. The shaft securing rings 32 arranged upon the larger diameter part 23 are under radial stress. The shaft securing rings 32 are limited in the axial direction by means of an annular or ring groove 34 provided in the bearing bore 33 of the electromagnet 26, the ring groove 34 is formed by a bored portion of the bearing bore 33 and which is covered by a plate or disc 35. Upon the smaller diameter part 24 of the cylindrical portion 22 there is arranged a spring 36 which presses the shaft securing rings 32 seated in a relaxed or non-stressed condition thereon, against the shoulder 25.

Figure 2:
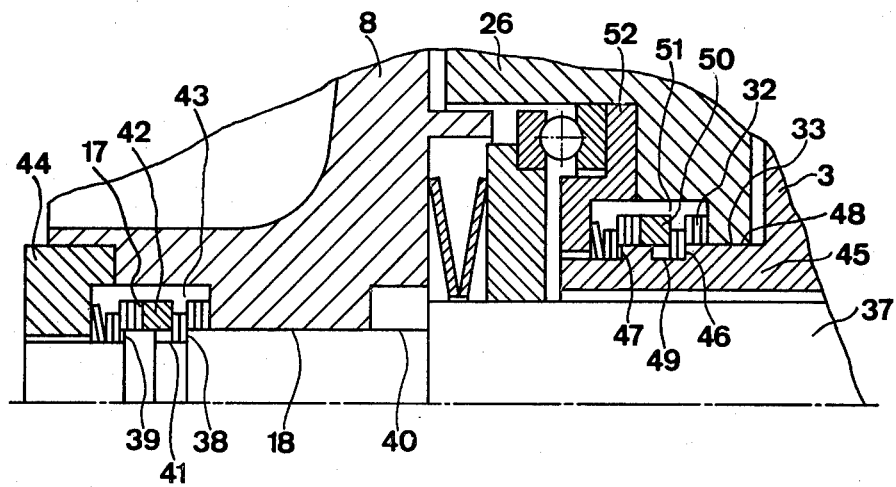
FIG. 2 is a fragmentary longitudinal sectional view of a variant construction of the automatic adjustment apparatuses, shown on an enlarged scale in relation to the showing of FIG. 1.

With respect to the variant embodiment of FIG. 2 it is to be understood that reference characters 3, 8, 17, 18, 26, 32 and 33 designate the same components as illustrated in FIG. 1. At the end of a drive shaft 37 there are arranged two shoulders 38 and 39, which in each case form an upright or right-angle transition from a larger diameter part 40 to a smaller diameter part 41 and the mutal spacing of which is equal to an integer multiple plus one-half of the thickness of a shaft securing or retaining ring 17. Between the shaft securing rings 17 associated with the corresponding shoulders 38, 39, there is arranged a spacer ring 42. The shaft securing rings 17 are limited in the axial direction by means of a ring groove 43 provided in the bearing bore 18 of the brake disc 8, this ring groove 43 being formed by a bored or otherwise machined portion of the bearing bore 18 and which is covered by a substantially pot-shaped disc 44.

Arranged at the intermediate wall 3 is a substantially cylindrical portion 45 concentrically surrounding the drive shaft 37, this cylindrical portion 45 having two shoulders 46 and 47 which each form a right-angle or vertical transition from a larger diameter part 48 to a smaller diameter part 49 and the spacing from one another is equal to an integer multiple plus one-half of the thickness of a shaft securing or retaining ring 32. Between the shaft securing rings 32 associated with the corresponding shoulders 46 and 47 is a spacer ring 50. The shaft securing rings 32 are limited in the axial direction by means of an annular or ring groove 51 provided in the bearing bore 33 of the electromagnet 26. The ring groove 51 is formed by a bored or otherwise machined portion of the bearing bore 33 and covered by a substantially pot-shaped disc 52.

There will now be considered the automatic adjustment apparatus described in conjunction with the showing of FIG. 1, the operation of which is as follows:

After wear of the brake lining 13 in the order of magnitude amounting to the thickness of a shaft securing ring 17, 32, the brake disc 8, under the action of the brake springs 12, has shifted by the same amount relative to the axial non-shiftable shoulder 16. Consequently, the shaft securing ring 17 arranged directly at the shoulder 16 upon the larger diameter part 14 jumps over or transfers onto the smaller diameter part 15, loses its radial stress and is pressed by means of the spring 21 against the shoulder 16. With the electromagnet 26 energized, the brake disc 8 can only lift-off of the brake lining 13 an amount corresponding to the spring path of the spring 21. The air gap which has been enlarged by the thickness of a shaft securing ring 17, 32 between the brake disc 8 and the electromagnet 26 is now compensated in that the electromagnet 26 is shifted in the direction of the brake disc 8 relative to the stationary shoulder 25. Consequently, the shaft securing ring 32 arranged directly at the shoulder 25 upon the larger diameter part 23 is stripped-off and jumps over to the smaller diameter part 24. The shaft securing ring 32 thus loses its radial stress and is pressed by means of the spring 36 against the shoulder 25. The brake disc 8 and the electromagnet 26 now assume a position which is fixed with the aid of the stray flux passing through the intermediate wall 3, thereby guaranteeing the maximum air stroke and preventing unintentional grinding of the brake disc 8 at the brake lining 13.

The adjustment movement of the brake disc 8 and the electromagnet 26 cannot be made retroactive, i.e. annihilated, since this is not possible due to the form-locking or frictional connection which is formed by means of the shaft securing rings 17, 32 bearing at the shoulders 16, 25 and seated in each case at the smaller diameter parts 15, 24.

The variant embodiment of the automatic adjustment apparatus, described on the basis of the showing of FIG. 2, operates in a similar manner, however with the difference that each time after wear of the brake lining 13 in the order of magnitude amounting to one-half of the thickness of a shaft securing ring 17, 32, the shaft securing ring 17, 32 seated directly at the corresponding shoulders 38, 39 or 46, 47 respectively, upon the larger diameter parts 40 and 48 respectively, are alternately shifted over to the smaller diameter parts 41 and 49 respectively. The spacer rings 42, 50 serve for transmitting the stipping-off movement to the shaft securing rings 17, 32 arranged at the corresponding second shoulder 39, 47.

In order to obtain a still finer incremental adjustment of the adjustment movements, it is possible to provide three or more shoulders, since then an adjustment operation is already possible after there has occurred wear of the brake lining of at most onethird of the thickness of a shaft securing ring.

It is also possible for cost saving reasons to omit the adjustment apparatus for the electromagnets. Of course, when doing so the air gap will be increased, which under certain circumstances could require the use of a more powerful electromagnet.

While there are shown and described present preferred embodiments of the invention, it is to be distinctly understood that the invention is not limited thereto, but may be otherwise variously embodied and practiced within the scope of the following claims. Accordingly,

What I claim is:

1. An automatic adjustment apparatus for a friction brake comprising at least two braking elements between which there is arranged a brake lining and which are adapted to be urged toward one another in a braking position, at least one of the braking elements being adjustably movable, comprising the combination of:
    a substantially cylindrical portion having a
    said cylindrical portion including a larger diameter part and a smaller diameter part;
    substantially disc-shaped adjustment elements arranged to both sides of said shoulder on said larger and smaller diameter parts;
    said disc-shaped adjustment elements being directly engageable with and displaceable by means of the adjustable braking element which is adjustably movable relative to the shoulder and the other braking element upon wear of the brake lining;
    the adjustment element arranged directly at the shoulder upon the larger diameter part of the cylindrical portion being displaceable onto the smaller diameter part of the cylindrical portion upon wear of the brake lining;
    the disc-shaped adjustment elements seated upon the larger diameter part of the cylindrical portion comprising shaft securing rings which are under constant radial stress during displacement along the larger diameter part and upon transfer to the smaller diameter part of the cylindrical portion lose their radial stress.

2. The automatic adjustment apparatus as defined in claim 1, wherein:
    transfer of a shaft securing ring from the larger diameter part to the smaller diameter part occurs upon wear of the brake lining on the order of magnitude amounting to approximately the thickness of one such shaft securing ring.

3. An automatic adjustment apparatus for a friction brake comprising at least two braking elements between which there is arranged a brake lining and which are adapted to be urged toward one another in a braking position, at least one of the braking elements being adjustably movable, comprising the combination of:
    a substantially cylindrical portion having a shoulder;
    said cylindrical portion including a larger diameter part and a smaller diameter part;
    substantially disc-shaped adjustment elements arranged to both sides of said shoulder on said larger and smaller diameter parts;
    said disc-shaped adjustment elements being displaceable by means of the adjustable braking element which is movable relative to the shoulder upon wear of the brake lining;
    the adjustment element arranged directly at the shoulder upon the larger diameter part of the cylindrical portion being displaceable onto the smaller diameter part of the cylindrical portion upon wear of the brake lining;
    the disc-shaped adjustment elements seated upon the larger diameter part of the cylindrical portion comprising shaft securing rings which are under radial stress and upon transfer to the smaller diameter part of the cylindrical portion lose their radial stress;
    at least one additional shoulder provided at the cylindrical portion;
    further substantially disc-shaped adjustment elements arranged to both sides of said additional shoulder;
    said two shoulders having a mutual spacing amounting to an integer multiple plus one-half of the thickness of a shaft securing ring;
    a spacer ring provided between the shaft securing rings associated with the corresponding shoulders for transmitting the adjustment movement occurring during wear of the brake lining; whereby,
    upon wear of the brake lining an amount essentially corresponding to the order of magnitude of one-half of the thickness of a shaft securing ring, the shaft securing rings seated directly at the shoulders at the larger diameter part alternately transfer to the smaller diameter part.

4. An automatic adjustment apparatus for a friction brake comprising at least two braking elements between which there is arranged a brake lining and which are adapted to be urged toward one another in a braking position, comprising the combination of:
    means mounting at least one of the braking elements to be adjustably movable;
    said mounting means including shaft portion having a shoulder;
    said shaft portion including a larger diameter part and a smaller diameter part;
    substantially disc-shaped adjustment elements arranged to both sides of said shoulder on said larger and smaller diameter parts;

said disc-shaped adjustment elements being directly engageably with and displaceably by means of said adjustably movable braking element which is adjustably movably along said shaft portion relative to the shoulder and the other braking element upon wear of the brake lining;

the adjustment element located directly at the shoulder upon the larger diameter part of the shaft portion being displaceable onto the smaller diameter part of the shaft portion upon wear of the brake lining;

the disc-shaped adjustment elements seated upon the larger diameter part of the cylindrical portion comprising ring members which are under constant radial stress during displacement along the larger diameter part and upon transfer to the smaller diameter part of the shaft portion lose their radial stress.

5. The automatic adjustment apparatus according to claim 4, including an electromagnet operatively associated with said friction brake and movably arranged on said shaft portion at an axial spacing from said adjustable braking element, said shaft portion further including a second larger diameter part and a second smaller diameter part with a second shoulder therebetween, further substantially disc-shaped adjustment elements arranged to both sides of said second shoulder on said second larger and smaller diameter parts, said further adjustment elements being displaceable by means of said electromagnet which is adjustably movable along said shaft portion relative to said second shoulder in response to the movement of said adjustable braking element upon wear of the brake lining to maintain the axial spacing between said adjustable braking element and said electromagnet, the further adjustment element located directly at the second shoulder upon the second larger diameter part being displaceable onto the second smaller diameter part upon movement of said electromagnet, said further adjustment elements comprising ring members which are under radial stress when seated upon said second larger diameter part and which lose their radial stress upon displacement and transfer to said second smaller diameter part.

* * * * *